(12) United States Patent
Heo

(10) Patent No.: US 9,812,681 B2
(45) Date of Patent: Nov. 7, 2017

(54) FLEXIBLE RECHARGEABLE BATTERY

(71) Applicant: SAMSUNG SDI CO., LTD., Yongin-si, Gyeonggi-do (KR)

(72) Inventor: Sang-Do Heo, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 267 days.

(21) Appl. No.: 14/830,976

(22) Filed: Aug. 20, 2015

(65) Prior Publication Data

US 2016/0260944 A1 Sep. 8, 2016

(30) Foreign Application Priority Data

Mar. 3, 2015 (KR) .................. 10-2015-0030003

(51) Int. Cl.
| | |
|---|---|
| *H01M 2/24* | (2006.01) |
| *H01M 2/10* | (2006.01) |
| H01M 2/20 | (2006.01) |
| H01M 10/42 | (2006.01) |

(52) U.S. Cl.
CPC ......... *H01M 2/1061* (2013.01); *H01M 2/202* (2013.01); *H01M 2/204* (2013.01); *H01M 10/425* (2013.01); *H01M 2220/30* (2013.01)

(58) Field of Classification Search
CPC .... H01M 2/1061; H01M 2/202; H01M 2/204; H01M 10/425; H01M 2220/30
See application file for complete search history.

(56) References Cited

U.S. PATENT DOCUMENTS

| 6,822,420 B2 | 11/2004 | Kozu et al. | |
|---|---|---|---|
| 7,601,457 B2 | 10/2009 | Byun et al. | |
| 8,741,453 B2 | 6/2014 | Kim et al. | |
| 2008/0057393 A1* | 3/2008 | Onuki | ........ H01M 2/1022 429/159 |
| 2011/0086523 A1* | 4/2011 | Yang | ........ H01R 12/707 439/83 |

(Continued)

FOREIGN PATENT DOCUMENTS

| KR | 20-0212929 Y1 | 11/2000 |
|---|---|---|
| KR | 10-2002-0087079 A | 11/2002 |

(Continued)

*Primary Examiner* — Raymond Alejandro
(74) *Attorney, Agent, or Firm* — Lee & Morse P.C.

(57) ABSTRACT

A flexible rechargeable battery includes a protection substrate including a first terminal and a second terminal, a wiring portion including a first wiring portion and a second wiring portion, a first end of each of the first and second wiring portions being connected to the first and second terminals, respectively, and the first wiring portion and the second wiring portion being adjacent to each other and disposed in parallel, first connecting members, portions of the first wiring portion being inserted into the first connecting members to be electrically connected to the first wiring portion, second connecting members, portions of the second wiring portion being inserted into the second connecting members to be electrically connected to the second wiring portion, and battery cells, each battery cell including a first terminal electrically connected to the first connecting member, and a second terminal electrically connected to the second connecting member.

16 Claims, 12 Drawing Sheets

(56) References Cited

U.S. PATENT DOCUMENTS

| | | | |
|---|---|---|---|
| 2011/0268996 A1* | 11/2011 | Lee | H01M 2/30 |
| | | | 429/7 |
| 2014/0370343 A1* | 12/2014 | Nomoto | H01M 10/4207 |
| | | | 429/90 |
| 2015/0222131 A1* | 8/2015 | Kano | H02J 7/0013 |
| | | | 320/112 |

FOREIGN PATENT DOCUMENTS

| | | |
|---|---|---|
| KR | 10-0778511 B1 | 11/2007 |
| KR | 10-2011-0036381 A | 4/2011 |

* cited by examiner

FLEXIBLE RECHARGEABLE BATTERY

CROSS-REFERENCE TO RELATED APPLICATION

Korean Patent Application No. 10-2015-0030003, filed on Mar. 3, 2015, in the Korean Intellectual Property Office, and entitled: "Flexible Rechargeable Battery," is incorporated by reference herein in its entirety.

BACKGROUND

1. Field

The present disclosure relates to a rechargeable battery. More particularly, the present disclosure relates to a flexible rechargeable battery in which an external appearance can be changed by an external force.

2. Description of the Related Art

A rechargeable battery can be repeatedly charged and discharged, unlike a primary battery that cannot be recharged. A rechargeable battery of a small capacity is used for small portable electronic devices, e.g., a mobile phone or a laptop computer and a camcorder, and a rechargeable battery of a large capacity is used as a power source, e.g., for driving a motor of a hybrid vehicle or a large capacity power storage device. In general, a rechargeable battery is formed with at least one battery cell, a control substrate that controls the at least one battery cell, and a molding or a case for protecting the battery cell and the control substrate from an external force.

SUMMARY

An exemplary embodiment provides a flexible rechargeable battery including a protection substrate including a protection substrate side first terminal and a protection substrate side second terminal, a wiring portion including a flexible first wiring portion and a flexible second wiring portion, a first end of each of the first and second wiring portions being connected to the protection substrate side first terminal and the protection substrate side second terminal, respectively, and the first wiring portion and the second wiring portion being adjacent to each other and disposed in parallel, a plurality of first connecting members, a corresponding portion of the first wiring portion being inserted into each of the first connecting members to be electrically connected to the first wiring portion, a plurality of second connecting members, a corresponding portion of the second wiring portion being inserted into each of the second connecting members to be electrically connected to the second wiring portion, and a plurality of battery cells, each battery cell including a battery cell side first terminal electrically connected to the first connecting member, and a battery cell side second terminal electrically connected to the second connecting member.

The first wiring portion and the second wiring portion may include a conductor portion of a metal material for enabling a current to flow, at least one of the first connecting member and the second connecting member may include a wiring fixing portion that encloses the conductor portion and in which a portion is opened and a first bracket that is extended at one end of the wiring fixing portion, and the battery cell side first terminal or the battery cell side second terminal may contact the first bracket.

The at least one of the first connecting member and the second connecting member may include a second bracket that is extended in a direction parallel to the first bracket at the other end of the wiring fixing portion, and the battery cell side first terminal or the battery cell side second terminal may be disposed between the first bracket and the second bracket.

The first bracket and the second bracket can be elastically deformed to change a mutual separation distance about a point that is connected to the wiring fixing portion.

The first bracket may include: a first area that is extended in a first direction in an end portion of the wiring fixing portion; and a second area that is extended in a second direction that is inclined by a predetermined angle from the first direction in an end portion of the first area.

The second bracket may include: a first area that is extended in the same direction as a direction in which the first area of the first bracket is extended; and a second area that is extended from an end portion of the first area in a direction symmetrical to the second area of the first bracket about the first direction.

The battery cell side first terminal may be formed in a metal plate shape that is protruded from the battery cell, and the battery cell side first terminal may be disposed between the first bracket and the second bracket of the first connecting member.

The battery cell side first terminal may be welded to the first bracket and the second bracket.

At the first bracket, the battery cell side first terminal, and the second bracket, penetrating through-holes may be formed, and the flexible rechargeable battery may further include a fastening member that mutually fixes the first bracket, the battery cell side first terminal, and the second bracket by simultaneously penetrating the through-holes.

In the wiring fixing portion, an inner surface, except for an opened portion, may closely contact the conductor portion.

The wiring fixing portion and the conductor portion may be welded.

The first wiring portion and the second wiring portion may include: a conductor portion of a metal material; a plurality of insulating portions that enclose the conductor portion and that insulate the conductor portion; and a plurality of exposure portions that are each disposed between the insulating portions and in which a portion of the conductor portion is exposed, wherein the first connecting member may be connected to the conductor portion that is located at the exposure portion of the first wiring portion, and the second connecting member may be connected to the conductor portion that is located at the exposure portion of the second wiring portion.

The first wiring portion and the second wiring portion may include a flexible conductor portion of a metal material that is formed in a plate shape.

The flexible rechargeable battery may further include a molding member that simultaneously encloses the protection substrate, the wiring portion, the first connecting member, the second connecting member, and the battery cell.

The flexible rechargeable battery may further include a folding member that connects to fold any one of the plurality of battery cells and another battery cell adjacent thereto.

The flexible rechargeable battery may further include: a first molding member that encloses any one of a plurality of battery cells and the first connecting member and the second connecting member that are connected thereto; and a second molding member that encloses other battery cells, except for the battery cell and the first connecting member and the second connecting member that are connected thereto.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
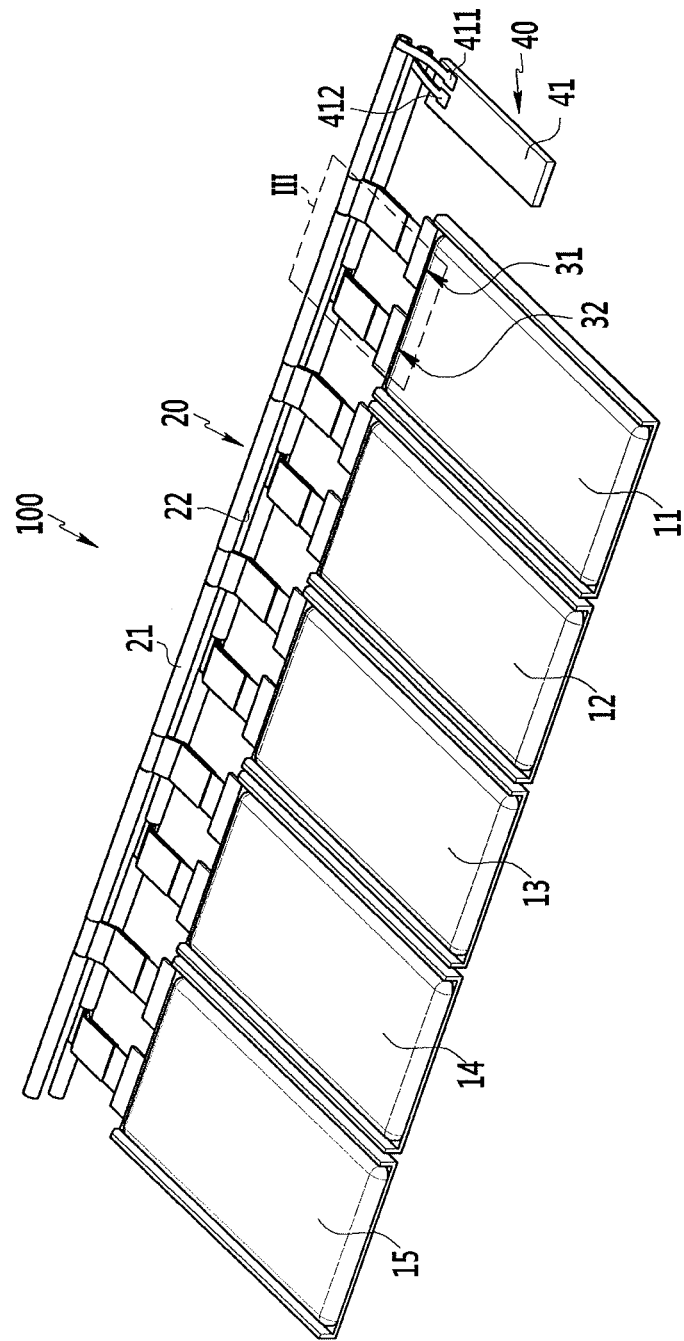
FIG. 1 illustrates a perspective view of a flexible rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Further, in the present disclosure, "on" indicates an upper part or a lower part of a target portion, and it does not mean that the target portion is always located at the upper side based on a gravity direction. In addition, in an entire specification, unless explicitly described to the contrary, the word "comprise" and variations such as "comprises" or "comprising" will be understood to imply the inclusion of stated elements but not the exclusion of any other elements. Like reference numerals refer to like elements throughout.

Hereinafter, a flexible rechargeable battery according to exemplary embodiments will be described in detail with reference to the FIGS. 1-5.

Figure 2:
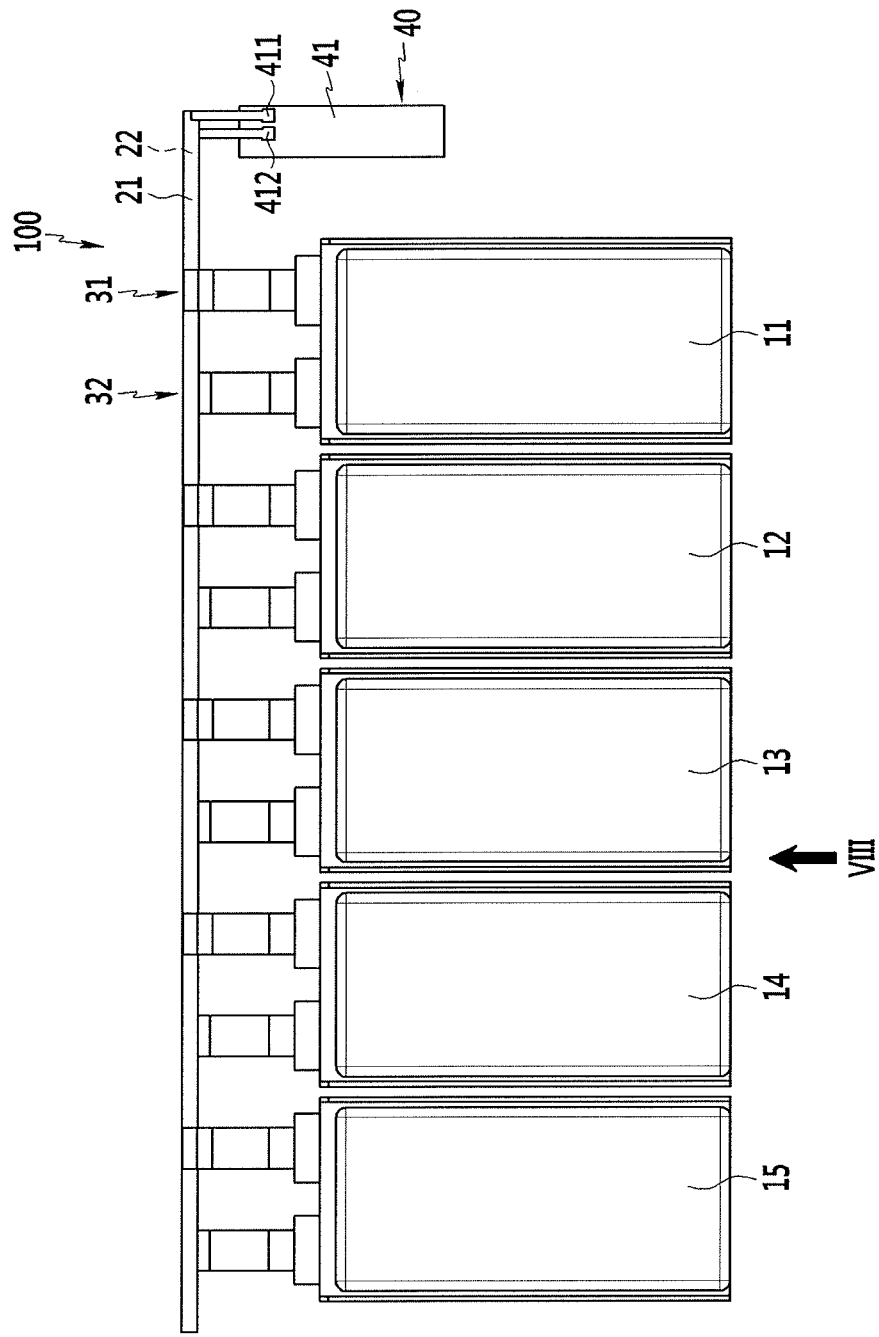
FIG. 2 illustrates a top plan view of the flexible rechargeable battery of FIG. 1.
Figure 3:
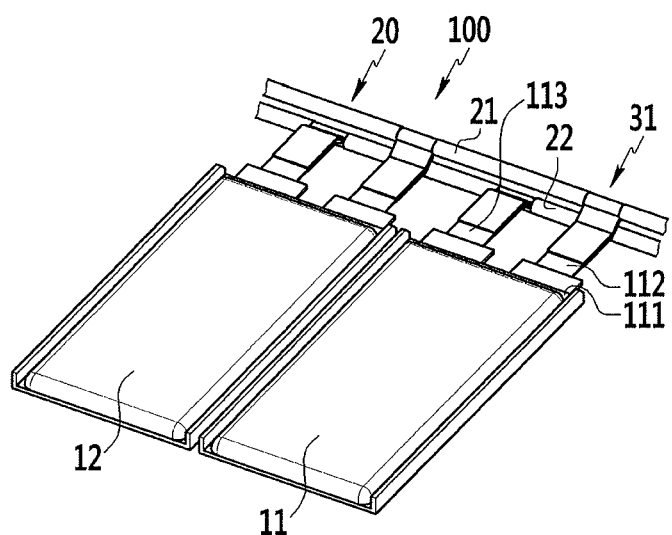
FIG. 3 illustrates an enlarged view of a portion III of FIG. 1.
Figure 4:
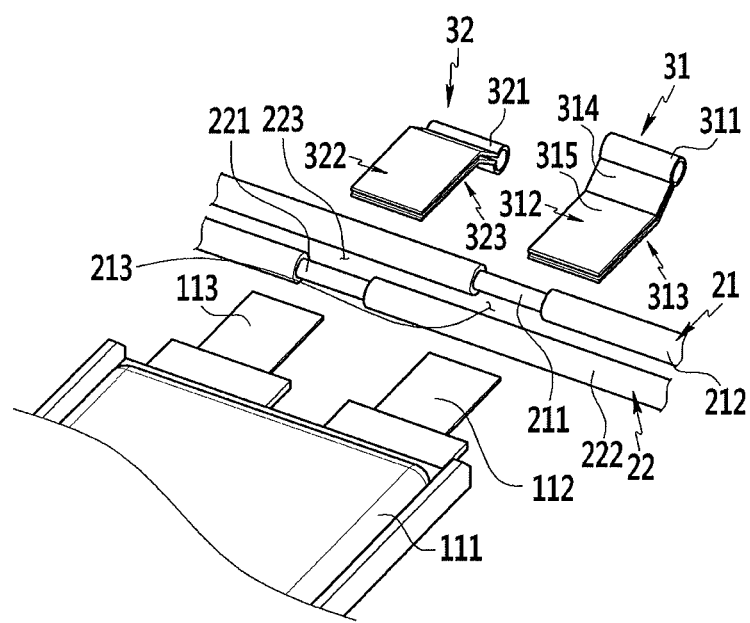
FIG. 4 illustrates an exploded perspective view of the flexible rechargeable battery of FIG. 1.
Figure 5:
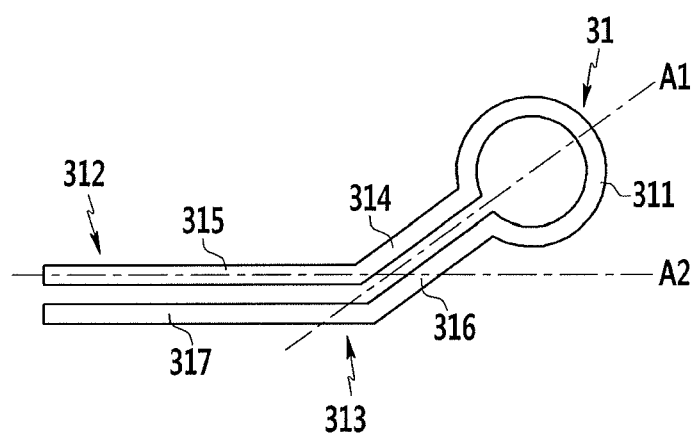
FIG. 5 illustrates a side view of a first connecting member of FIG. 1.

FIG. 1 illustrates a perspective view of a flexible rechargeable battery according to an exemplary embodiment. FIG. 2 illustrates a top plan view of the flexible rechargeable battery of FIG. 1, and FIG. 3 illustrates an enlarged view of a portion III of FIG. 1. FIG. 4 illustrates an exploded perspective view of the flexible rechargeable battery of FIG. 1, and FIG. 5 illustrates a side view of a first connecting member of FIG. 1.

Referring to FIGS. 1 to 5, a flexible rechargeable battery 100 according to the present exemplary embodiment may include a plurality of battery cells, e.g., first through fifth battery cells 11,12,13,14, and 15, a wiring portion 20, a plurality of connecting members 31 and 32, and a protection substrate 40. In more detail, each of the plurality of battery cells, e.g., each of the first through fifth battery cells 11,12, 13,14, and 15, may have a separation membrane, a positive electrode material, a negative electrode material, and an electrolyte therein, and may be, e.g., a lithium ion battery, a polymer battery, or a lithium polymer battery. A battery form that is described in the foregoing description is just an illustration, and the battery cells 11,12,13,14, and 15 according to the present disclosure are not limited thereto.

Referring to FIGS. 1-2, the battery cells 11,12,13,14, and 15 are disposed in parallel with each other. Referring to FIG. 3, each of the battery cells 11,12,13,14, and 15 may include a battery cell case 111 forming an external form, a battery cell side first electrode 112, and a battery cell side second electrode 113 protruding at one side of the battery cell case 111. The battery cell side first electrode 112 and the battery cell side second electrode 113 may be a positive electrode (+) terminal and a negative electrode (−) terminal, respectively, and may be formed in a plate shape of a conductive material, e.g., aluminum.

For stabilization of an electrode material that is provided at the inside of the battery cells 11,12,13,14, and 15, the protection substrate 40 is a battery protection circuit module for controlling a use current and a use voltage of the battery cells 11,12,13,14, and 15. Referring to FIGS. 1-2, the protection substrate 40 may be located at one side of the plurality of battery cells 11,12,13,14, and 15, and may include a substrate body 41, and a substrate side first terminal 411 and a substrate side second terminal 412 that are formed at one surface of the substrate body 41. In this case, the substrate side first terminal 411 may be a positive electrode (+) terminal, and the substrate side second terminal 412 may be a negative electrode (−) terminal.

The wiring portion 20 is electrically connected to the plurality of battery cells 11,12,13,14, and 15 and the protection substrate 40, and enables a current to flow between the battery cells 11,12,13,14, and 15 and the protection substrate 40. The wiring portion 20 is disposed at an upper portion of the plurality of battery cells 11,12,13,14, and 15, and includes a first wiring portion 21 and a second wiring portion 22 that are extended in a direction in which the battery cells 11,12,13,14, and 15 are disposed.

The first wiring portion 21 and the second wiring portion 22 are made of a flexible material and are disposed in a parallel direction in an adjacently located state. A first end of the first wiring portion 21 is electrically connected to the substrate side first terminal 411, and a first end of the second wiring portion 22 is electrically connected to the substrate side second terminal 412. A connection of the first wiring portion 21 and the substrate side first terminal 411 and a connection of the second wiring portion 22 and the substrate side second terminal 412 may be performed by, e.g., soldering.

In detail, referring to FIG. 4, the first wiring portion 21 includes a first wiring conductor portion 211 of a conductive metal material, a plurality of first wiring insulating portions 212 that are formed in a shape that encloses the first wiring conductor portion 211 and that insulate the first wiring conductor portion 211, and a plurality of first wiring exposing portions 213 that are disposed between the plurality of first wiring insulating portions 212 and in which a portion of the first wiring conductor portion 211 is exposed to the outside.

Similarly, the second wiring portion 22 includes a second wiring conductor portion 221, a second wiring insulating portion 222, and a second wiring exposing portion 223, as in the first wiring 21. A configuration of the second wiring portion 22 is substantially the same as a configuration of the first wiring portion 21 and thus a detailed description thereof will be omitted.

The first wiring the exposure portion 213 and the second wiring exposure portion 223 are alternately disposed. That is, any one first wiring exposure portion 213 is located between two second wiring exposing portions 223. The first wiring conductor portion 211 and the second wiring conductor portion 221 may be made of, e.g., aluminum.

The connecting members 31 and 32 electrically connect the battery cells 11,12,13,14, and 15 and the wiring portion 20. The connecting members 31 and 32 include a plurality of first connecting members 31 and a plurality of second connecting members 32, respectively, and are provided in the same form as that of a metal clip that is made of a conductive metal material, e.g., aluminum.

Referring to FIG. 4, a first side of the first connecting member 31 is connected to the first wiring conductor portion 211 that is located at the exposure portion 213 of the first wiring portion 21, and a second side of the first connecting member 31 is connected to the battery cell side first electrode 112 of the first battery cell 11. In more detail, the first connecting member 31 includes a wiring fixing portion 311 at its first end to be connected to the first wiring conductor portion 211, and a first bracket 312 and a second bracket 313 at its second end to be connected to battery cell side first electrode 112.

Figure 6:
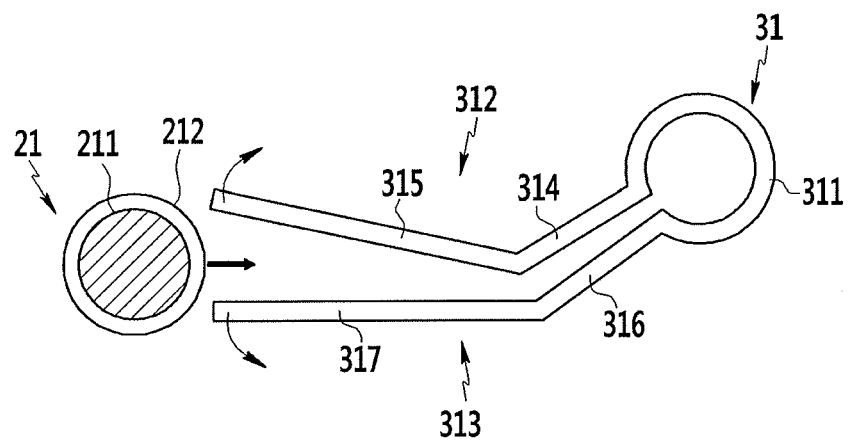
FIGS. 6 and 7 illustrate diagrams of an assembling process of the flexible rechargeable battery of FIG. 1.

The wiring fixing portion 311 is formed to enclose the first wiring conductor portion 211, and is formed in a shape in which a portion is opened, e.g., the wiring fixing portion 311 may have a tubular shape concentric with and surrounding the first wiring conductor portion 211. As illustrated in FIG. 5, a portion of the wiring fixing portion 311 is open, e.g., between first and second brackets 312 and 313 to allow insertion of the wiring conductor portion 211 therebetween (FIG. 6). A cross-section of the first wiring conductor portion 211 according to the present exemplary embodiment is formed in a circular shape, and an interior circumferential surface of the wiring fixing portion 311 may be formed in a circular shape corresponding to an external circumferential surface of the first wiring conductor portion 211 so that the wiring fixing portion 311 closely contacts the first wiring conductor portion 211.

The first bracket 312 is connected to a first end of the wiring fixing portion 311, i.e., a first end adjacent to the open portion of the wiring fixing portion 311 (FIG. 5), and extends therefrom toward the battery cell side first electrode 112. The first bracket 312 is located at an opened portion of the wiring fixing portion 311, and includes a first area 314 and a second area 315.

Referring to FIG. 5, the first area 314 is extended in a first direction A1 with a first end connected to the wiring fixing portion 311, and a second end connected to the second area 315. The second area 315 is extended in a second direction A2. The second direction A2 is formed to be inclined by a predetermined angle θ from the first direction A1. That is, the first bracket 312 is formed in a bent shape, i.e., in which a portion is bent.

The second bracket 313 is connected to a second end of the wiring fixing portion 311, i.e., a second end adjacent to the open portion of the wiring fixing portion 311 (FIG. 5), and is formed in parallel to and separated by a predetermined distance from the first bracket 312. The second bracket 313 forms a first area 316 and a second area 317, as in the first bracket 312. A configuration of the second bracket 313 is substantially the same as that of the first bracket 312, and thus a detailed description thereof will be omitted. A separation distance of the first bracket 312 and the second bracket 313 is formed smaller than an inner circumference diameter of the wiring fixing portion 311.

Hereinafter, a process of connecting the first wiring conductor portion 211 and the battery cell side first electrode 113 to the first connecting member 31 will be described with reference to FIGS. 6-7.

Figure 7:
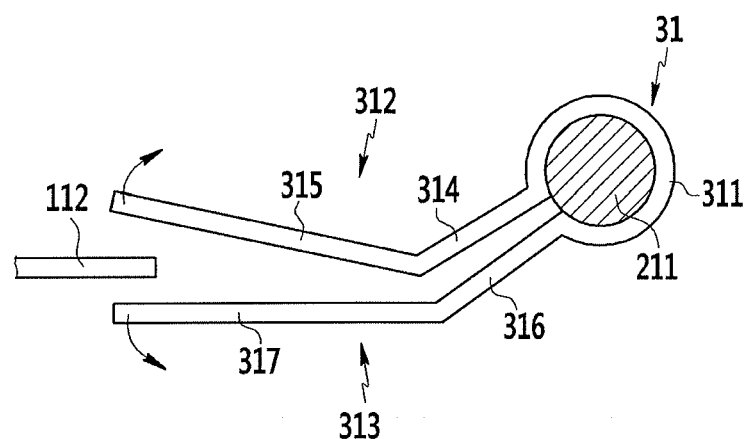

FIGS. 6 and 7 illustrate diagrams illustrating an assembling process of the flexible rechargeable battery of FIG. 1.

Referring to FIG. 6, when applying an external force in a receding direction to the end portion side of the first bracket 312 and the second bracket 313 of the first connecting member 31, the first bracket 312 and the second bracket 313 are elastically deformed to increase a distance therebetween. Thereafter, the first wiring conductor portion 211 is inserted into the increased separated space between the first bracket 312 and the second bracket 313, and is moved between the first and second brackets 312 and 313 to the wiring fixing portion 311 side.

Referring to FIG. 7, when the first wiring conductor portion 211 is inserted into the wiring fixing portion 311 side through an opening of the wiring fixing portion 311, an interior circumferential surface of the wiring fixing portion 311 and an external circumferential surface of the first wiring conductor portion 211 contact each other. Thus, an electrical connection between the first connecting member 31 and the first wiring portion 21 is formed. Thereafter, the battery cell side first electrode 112 is inserted between the first bracket 312 and the second bracket 313 of the first wiring conductor portion 211.

Subsequently, when an external force that is applied to the first bracket 312 and the second bracket 313 of the first wiring conductor portion 211 is removed, the first bracket 312 and the second bracket 313 are elastically restored to their original form, i.e., to closely contact opposite respective surfaces of the battery cell side first electrode 112. Thus, an electrical connection between the first connecting member 31 and the battery cell side first electrode 112 is formed.

In a rechargeable battery according to the present exemplary embodiment, the first bracket 312 and the second bracket 313 of the first connecting member 31 and the battery cell side first electrode 112 that is disposed therebetween may be more securely fixed by welding. Further, the wiring fixing portion 311 and the first wiring conductor portion 211 of the first connecting member 31 are welded to be more securely connected.

When fixing of the first connecting member 31 and the battery cell side first electrode 112 is securely performed, the wiring fixing portion 311 of the first connecting member 31 further presses the conductor portion 211 that is inserted therein. That is, as an inner surface of the wiring fixing portion 311 closely contacts an outer surface of the conductor portion 211, an electrical connection between the first connecting member 31 and the first wiring portion 21 may be more reliably performed.

The second connecting member 32 includes a wiring fixing portion 321, a first bracket 322, and a second bracket 323. The first bracket 322 and the second bracket 323 include a first area (not shown) and a second area (not shown), respectively, and thus the second connecting member 32 is formed in a shape in which a portion is bent, as in the first connecting member 31. However, the second area of the second connecting member 32 is formed in a shape that is bent in a direction opposite to the second areas 315 and 317 of the first connecting member 32. For example, as illustrated in FIG. 4, if the second areas 315 and 317 of the first connecting member 31, as well as the second areas of the second connecting member 32, are arranged in parallel to the battery cell side first and second electrodes 112 and 113, the first areas 314/316 of the first connecting member 31 are bend relative to the second areas 315/317 of the first connecting member 31 in an opposite direction as compared to the bending direction of the first areas of the second connecting member 32 with respect to the second areas.

A detailed configuration of the second connecting member 32 is different in the above configuration, and is substantially the same as a configuration of the first connecting member 31 in other configurations. Thus, a detailed description thereof will be omitted. Further, a connection configuration of the second connecting member 32, the second wiring portion 22, and the battery cell side second terminal 113 is substantially the same as a connection configuration of the first connecting member 31, the first wiring portion 21, and the battery cell side first terminal 114, and thus a detailed description thereof will be omitted.

When the first connecting member 31, the second connecting member 32, the first battery cell 11, the first wiring portion 21, and the second wiring portion 22 are connected, an electrical connection between the first battery cell 11 and the protection substrate 40 may be formed. An electrical connection between each of the second battery cell 12, the third battery cell 13, the fourth battery cell 14, the fifth battery cell 15, and the protection substrate 40 is formed by another first connecting member 31 and second connecting member 32, and thus a detailed description thereof will be omitted.

As the first battery cell 11 to the fifth battery cell 15 according to the present exemplary embodiment are connected to the protection substrate 40 through one first wiring portion 21 and one second wiring portion 22, the first battery cell 11 to the fifth battery cell 15 are connected in parallel to the protection substrate 40.

The first connecting member 31 and the second connecting member 32 of the rechargeable battery 100 according to the present exemplary embodiment are formed in a shape in which portions thereof are bent in different directions. Therefore, even in a case in which the battery cell side first electrode 112 and second electrode 113 of the battery cells 11,12,13,14, and 15 are located on the same plane, mutual interference can be minimized.

Figure 8:
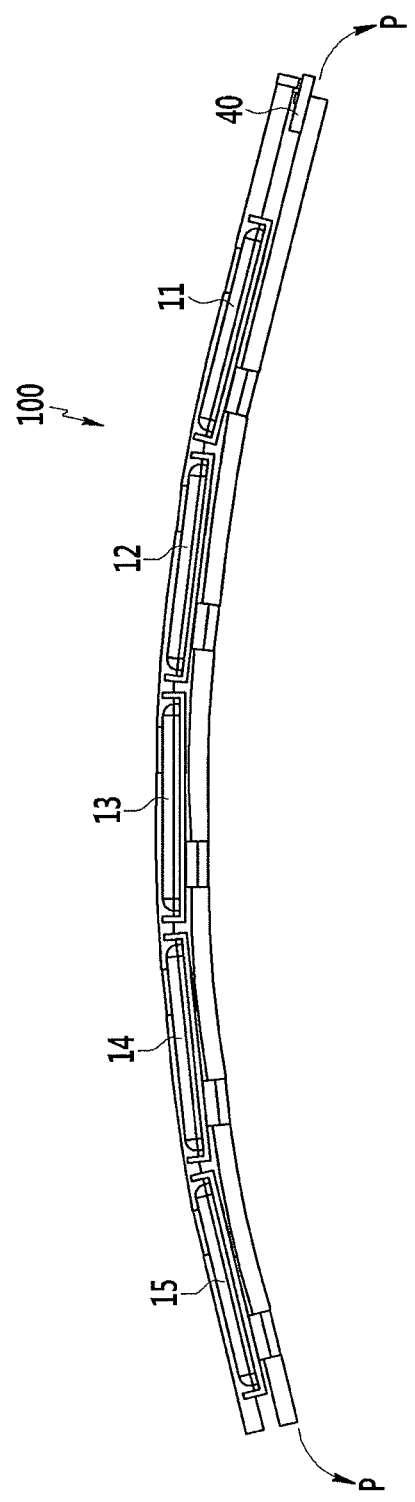
FIG. 8 illustrates a side view of the flexible rechargeable battery taken in a direction VIII of FIG. 2.

FIG. 8 illustrates a side view of the flexible rechargeable battery 100 taken from a direction VIII of FIG. 2.

Referring to FIG. 8, an external appearance of the flexible rechargeable battery 100 according to the present exemplary embodiment may be flexibly bent by an external force P. In more detail, when an external force P of a predetermined magnitude operates downwardly at opposite end portions of the flexible rechargeable battery 100, i.e., on the protection substrate 40 and on the fifth battery cell 15 of the flexible rechargeable battery 100, the flexible rechargeable battery 100 may be bent in a circular arc shape using a point that is located in a lower portion as the center. When applying a force operating upward to the opposite end portions of the flexible rechargeable battery 100, the flexible rechargeable battery 100 may be bent in a circular arc shape using a point that is located in an upper portion as the center.

That is, in an upper portion of the first battery cell 11 to the fifth battery cell 15, as wiring portions 21 and 22 that are disposed in a length direction of the flexible rechargeable battery 100 are flexibly formed, the flexible rechargeable battery 100 may be easily bent in a desired direction by an external force P operating at the both end portion sides. Further, as a plurality of battery cells 11,12,13,14, and 15 are coupled in parallel to the substrate side first electrode 411 and the substrate side second electrode 412 of the protection substrate 40 through the first wiring portion 21 and the second wiring portion 22, an area of the protection substrate 40 can be formed in a smaller size and a circuit configuration can be simplified.

Figure 9:
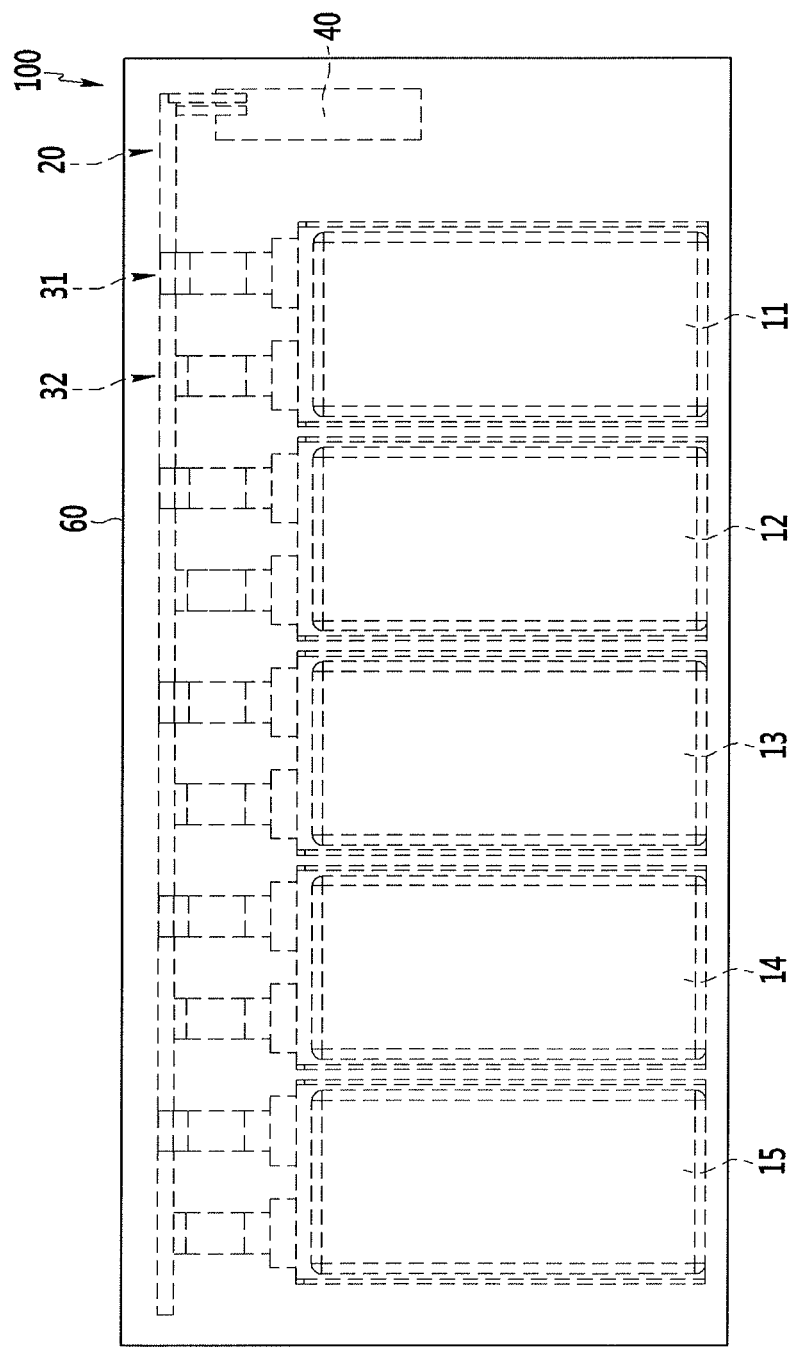
FIG. 9 illustrates a top plan view of a flexible rechargeable battery according to another exemplary embodiment.

FIG. 9 illustrates a top plan view of a flexible rechargeable battery according to another exemplary embodiment. The present exemplary embodiment is substantially the same as the embodiment of FIGS. 1 to 8, except further including a molding member 60. Thus, only differences between the two embodiments will be described hereinafter.

Referring to FIG. 9, the flexible rechargeable battery 100 according to the present exemplary embodiment may includes a quadrangular-shaped molding member 60 that simultaneously encloses the protection substrate 40, the wiring portion 20, the first connecting member 31, the second connecting member 32, and the plurality of battery cells 11, 12, 13, 14, and 15. The molding member 60 forms an external appearance of the flexible rechargeable battery 100, thereby protecting a configuration of the inside from an impact of the outside. Further, the molding member 60 is made of a flexible polymer material, e.g., urethane or synthetic rubber, and enables the flexible rechargeable battery 100 to change an external appearance in a desired shape by an external force.

The rechargeable battery 100 according to the present exemplary embodiment may include a folding member (not shown) for connecting to fold the battery cells 11,12,13,14, and 15 to each other. The folding member may be made of, e.g., a flexible polymer material. One side of the folding member is connected to a side surface of any one battery cell 11, and the other side thereof is connected to a side surface of another battery cell 12 adjacent thereto. The battery cells 11 and 12 may be folded to each other about the folding member.

In the present exemplary embodiment, it is described that the folding member is made of a flexible polymer material. However, embodiments are not limited thereto, e.g., the folding member may be formed with a hinge-coupling body.

Figure 10:
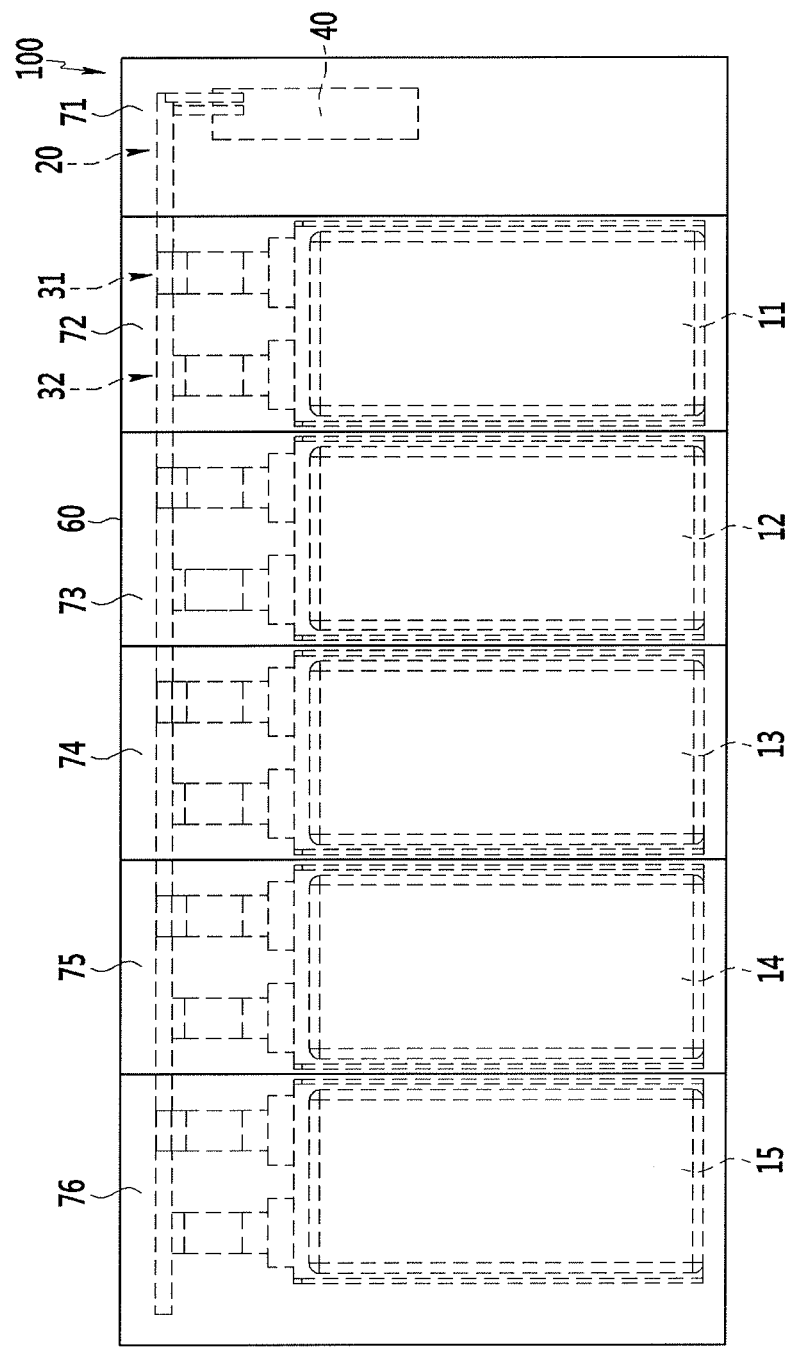
FIG. 10 illustrates a top plan view of a flexible rechargeable battery according to another exemplary embodiment.

FIG. 10 illustrates a top plan view of a flexible rechargeable battery according to another exemplary embodiment. The present exemplary embodiment is substantially the same as the embodiment of FIGS. 1 to 8, except further including a plurality of molding members 71 to 76. Thus, only differences between the two embodiments will be described hereinafter.

Referring to FIG. 10, the flexible rechargeable battery 100 according to the present exemplary embodiment includes a first molding member 71 to a sixth molding member 76 that protect an internal configuration from an impact of the outside and that are connected to fold. The first molding member 71 is formed in a shape that encloses the protective substrate 40 and a partial area of the wiring portion 20 that is connected to the protective substrate 40.

The second molding member 72 is formed in a shape that encloses the first battery cell 11, he connecting members 31 and 32 that are connected to the first battery cell 11, and a partial area of the wiring portion 20 that is connected to the connecting members 31 and 32. A configuration of the third molding member 73 to the sixth molding member 76 is substantially the same as that of the second molding member 72, and thus a detailed description thereof will be omitted.

Respective molding members 71 to 76 are connected to fold to adjacent molding members 71 to 76. In this case, between the molding members 71 to 76, a molding connecting member (not shown) for connecting to fold the molding members 71 to 76 may be included, and the molding connecting member may be, e.g., a hinge coupling body. In this case, the wiring portion 20 that connects the battery cells 11 to 15 and the protection substrate 40 is disposed over the first molding member 71 to the sixth molding member 76, and is disposed to pass through a through-hole that penetrates any one of the plurality of molding members 71 to 76 and other molding members adjacent thereto.

In the present exemplary embodiment, it is described that the molding connecting member is a hinge coupling body. However, as the molding connecting member is provided with a string of a polymer material, the molding connecting member may have a configuration that is thermally bonded to any one of the molding members 71 to 76 and other molding members adjacent to the molding member.

Figure 11:
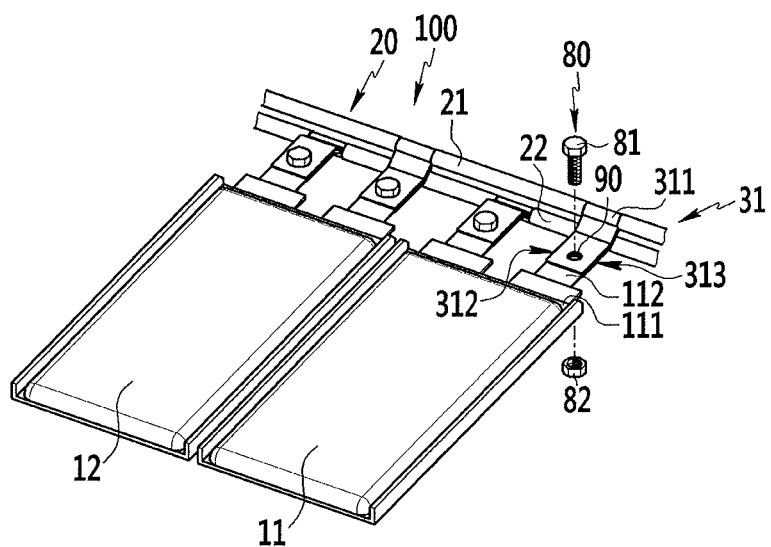
FIG. 11 illustrates a partial enlarged view of a flexible rechargeable battery according to another exemplary embodiment.

FIG. 11 illustrates a partial enlarged view of a flexible rechargeable battery according to another exemplary embodiment. The present exemplary embodiment is substantially the same as the embodiment of FIGS. 1 to 8, except further including a fastening member 80. Thus, only differences between the two embodiments will be described hereinafter.

Referring to FIG. 11, the flexible rechargeable battery 100 according to the present exemplary embodiment further includes the fastening member 80 for fixing the connecting member 31 and the battery cell side electrode 112. The fastening member 80 may include, e.g., a fastening bolt 81 and a fastening nut 82.

In a state in which the battery cell side electrode 113 is disposed between the first bracket 312 and the second bracket 313 of the connecting member 31, the fastening bolt 81 is inserted into a through-hole 90 that sequentially penetrates the first bracket 312, the battery cell side electrode 112, and the second bracket 313. When the fastening bolt 81 is completely inserted into the through-hole 90, the fastening nut 82 is fastened to an end portion of the fastening bolt 81. By pressing the second bracket 313 to a head direction of the fastening bolt 81, i.e., the battery cell side electrode 113 side, the fastened fastening nut 82 enables fixing between the connecting member 31 and the battery cell side electrode 113 to be more securely performed.

Figure 12:
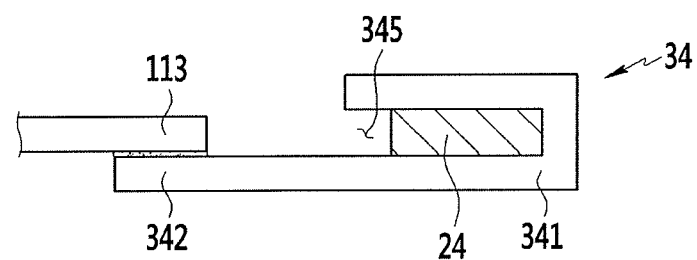
FIG. 12 illustrates a partial enlarged view of a flexible rechargeable battery according to another exemplary embodiment.

FIG. 12 illustrates a partial enlarged view of a connecting member of a flexible rechargeable battery according to another exemplary embodiment. The present exemplary embodiment is substantially the same as the embodiment of FIGS. 1 to 8, except for a different configuration of the connecting members 31 and 32. Thus, only differences between the two embodiments will be described hereinafter.

Referring to FIG. 12, the wiring portion 20 according to the present exemplary embodiment includes a conductor portion 24 with a flexible plate shape. A wiring fixing portion 341 of a connecting member 34 into which a portion of the conductor portion 24 is inserted has a rectangular inner surface corresponding to a shape of a cross-section of the conductor portion 24, and at one side thereof, an opening 345 for inserting a portion of the conductor portion 24 is formed. At one end of the wiring fixing portion 341, a first bracket 342 for fixing a battery cell side terminal 113 is extended. The battery cell side terminal 113 may be fixed to the first bracket 342 in a state that it is electrically connected by a method such as welding.

By way of summation and review, demand for an apparatus that essentially uses a rechargeable battery with a handheld product has increased, and many apparatuses include a portion with a changeable external appearance according to use. However, after being changed together with an external appearance of the apparatus, a flexible rechargeable battery needs to be restored to its original shape when an external force is removed.

Therefore, example embodiments provide a rechargeable battery capable of changing its external form. That is, as described above, a flexible rechargeable battery according to an exemplary embodiment changes its external shape in response to application of an external force, and is restored to its original shape once the external force is removed. Further, as a plurality of battery cells are coupled in parallel to the protection substrate side through a first wiring portion and a second wiring portion, an area of a protection substrate can be formed in a reduced size and a circuit configuration can be simplified.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible rechargeable battery, comprising:
a protection substrate including a protection substrate side first terminal and a protection substrate side second terminal;
a wiring portion including a flexible first wiring portion and a flexible second wiring portion, a first end of each of the first and second wiring portions being connected to the protection substrate side first terminal and the protection substrate side second terminal, respectively, and the first wiring portion and the second wiring portion being adjacent to each other and disposed in parallel;
a plurality of first connecting members, a corresponding portion of the first wiring portion being inserted into each of the first connecting members to be electrically connected to the first wiring portion;
a plurality of second connecting members, a corresponding portion of the second wiring portion being inserted into each of the second connecting members to be electrically connected to the second wiring portion; and
a plurality of battery cells, each battery cell including a battery cell side first terminal electrically connected to the first connecting member, and a battery cell side second terminal electrically connected to the second connecting member.

2. The flexible rechargeable battery as claimed in claim 1, wherein:
each of the first wiring portion and the second wiring portion includes a conductor portion of a metal material for enabling a current to flow, at least one of the first connecting member and the second connecting member includes a wiring fixing portion that encloses the conductor portion and in which a portion is opened, and a first bracket that is extended at a first end of the wiring fixing portion, and the battery cell side first terminal or the battery cell side second terminal contacts the first bracket.

3. The flexible rechargeable battery as claimed in claim 2, wherein:

the at least one of the first connecting member and the second connecting member further comprises a second bracket that is extended in a direction parallel to the first bracket at a second end of the wiring fixing portion, and the battery cell side first terminal or the battery cell side second terminal is disposed between the first bracket and the second bracket.

4. The flexible rechargeable battery as claimed in claim 3, wherein the first bracket and the second bracket are elastically deformable to change a mutual separation distance about a point that is connected to the wiring fixing portion.

5. The flexible rechargeable battery as claimed in claim 3, wherein the first bracket includes:

a first area that is extended in a first direction from the wiring fixing portion, a first end portion of the first area being connected to the wiring fixing portion; and a second area that is extended in a second direction that is inclined by a predetermined angle from the first direction, a second end portion of the first area being connected to the second area.

6. The flexible rechargeable battery as claimed in claim 5, wherein the second bracket includes:

a first area that is extended in a same direction as a direction in which the first area of the first bracket is extended; and a second area that is extended from an end portion of the first area in a direction symmetrical to the second area of the first bracket about the first direction.

7. The flexible rechargeable battery as claimed in claim 5, wherein the battery cell side first terminal is metal plate shaped and protrudes from the battery cell, the battery cell side first terminal being between the first bracket and the second bracket of the first connecting member.

8. The flexible rechargeable battery as claimed in claim 7, wherein the battery cell side first terminal is welded to the first bracket and the second bracket.

9. The flexible rechargeable battery as claimed in claim 7, further comprising:

penetrating through-holes at the first bracket, the battery cell side first terminal, and the second bracket; and a fastening member that mutually fixes the first bracket, the battery cell side first terminal, and the second bracket by simultaneously penetrating the through-holes.

10. The flexible rechargeable battery as claimed in claim 2, wherein in the wiring fixing portion, an inner surface, except for an opened portion, closely contacts the conductor portion.

11. The flexible rechargeable battery as claimed in claim 2, wherein the wiring fixing portion and the conductor portion are connected.

12. The flexible rechargeable battery as claimed in claim 1, wherein the first wiring portion and the second wiring portion include:

a conductor portion of a metal material;

a plurality of insulating portions that enclose the conductor portion and that insulate the conductor portion; and a plurality of exposure portions that are each disposed between the insulating portions and in which a portion of the conductor portion is exposed, wherein the first connecting member is connected to the conductor portion that is located at the exposure portion of the first wiring portion, and the second connecting member is connected to the conductor portion that is located at the exposure portion of the second wiring portion.

13. The flexible rechargeable battery as claimed in claim 1, wherein the first wiring portion and the second wiring portion include a flexible conductor portion of a metal material that has a plate shape.

14. The flexible rechargeable battery as claimed in claim 1, further comprising a molding member that simultaneously encloses the protection substrate, the wiring portion, the first connecting member, the second connecting member, and the battery cell.

15. The flexible rechargeable battery as claimed in claim 14, further comprising a folding member that connects to fold any one of the plurality of battery cells and another battery cell adjacent thereto.

16. The flexible rechargeable battery as claimed in claim 1, further comprising:

a first molding member that encloses any one of a plurality of battery cells and the first connecting member and the second connecting member that are connected thereto; and a second molding member that encloses other battery cells, except for the battery cell and the first connecting member and the second connecting member that are connected thereto.

* * * * *